US009088419B2

(12) United States Patent
Zaverucha et al.

(10) Patent No.: US 9,088,419 B2
(45) Date of Patent: *Jul. 21, 2015

(54) KEYED PV SIGNATURES

(75) Inventors: Gregory Marc Zaverucha, Mississauga (CA); Scott Alexander Vanstone, Campbellville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,941

(22) Filed: Mar. 16, 2012

(65) Prior Publication Data
US 2012/0239930 A1 Sep. 20, 2012

Related U.S. Application Data

(60) Provisional application No. 61/454,445, filed on Mar. 18, 2011.

(51) Int. Cl.
*H04L 29/06* (2006.01)
*H04L 9/32* (2006.01)
*H04L 9/30* (2006.01)

(52) U.S. Cl.
CPC ............ *H04L 9/3252* (2013.01); *H04L 9/3066* (2013.01); *H04L 9/3218* (2013.01)

(58) Field of Classification Search
CPC .... H04L 9/3066; H04L 9/3252; H04L 9/3218
USPC ........................................................ 713/168
See application file for complete search history.

(56) References Cited

U.S. PATENT DOCUMENTS

| | | | |
|---|---|---|---|
| 6,847,951 B1 * | 1/2005 | Cordery et al. ................. | 705/60 |
| 7,181,017 B1 * | 2/2007 | Nagel et al. .................... | 380/282 |
| 7,231,663 B2 * | 6/2007 | Medvinsky ..................... | 726/10 |
| 7,249,259 B1 | 7/2007 | Vanstone et al. | |
| 7,613,660 B2 * | 11/2009 | Pintsov ........................... | 705/60 |
| 7,676,677 B2 * | 3/2010 | Chen et al. ..................... | 713/176 |
| 7,730,319 B2 * | 6/2010 | Ramzan et al. ................ | 713/180 |
| 7,818,792 B2 * | 10/2010 | Shamsaasef et al. ........... | 726/10 |
| 7,849,317 B2 * | 12/2010 | Euchner et al. ................ | 713/176 |
| 7,877,610 B2 | 1/2011 | Vanstone et al. | |
| 7,940,927 B2 * | 5/2011 | Futa et al. ........................ | 380/28 |
| 8,316,237 B1 * | 11/2012 | Felsher et al. ................. | 713/171 |

(Continued)

OTHER PUBLICATIONS

ANSI Draft X9.92/2007-02-21: Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2007.

(Continued)

*Primary Examiner* — David García Cervetti
(74) *Attorney, Agent, or Firm* — Tom Grzesik; Fleit Gibbons Gutman Bongini & Bianco P.L.

(57) ABSTRACT

A system and method enabling a recipient correspondent of a keyed PV signature to convert it to a signature with properties similar to a traditional signature (i.e., where the message is public and may be verified by anyone), removing the keyed aspect of the signature. The recipient correspondent may transfer the converted signature to a third party and provide the third party with a proof of knowledge such that the third party may be convinced that the originator of the signature signed the message.

19 Claims, 3 Drawing Sheets

(56) References Cited

U.S. PATENT DOCUMENTS

| | | | |
|---|---|---|---|
| 2002/0107803 A1* | 8/2002 | Lisanke et al. | 705/51 |
| 2003/0149871 A1* | 8/2003 | Medvinsky | 713/155 |
| 2003/0149880 A1* | 8/2003 | Shamsaasef et al. | 713/182 |
| 2003/0190046 A1* | 10/2003 | Kamerman et al. | 380/286 |
| 2004/0128254 A1* | 7/2004 | Pintsov | 705/62 |
| 2005/0076223 A1* | 4/2005 | Chen et al. | 713/176 |
| 2005/0271207 A1* | 12/2005 | Frey | 380/263 |
| 2006/0056621 A1* | 3/2006 | Ramzan et al. | 380/28 |
| 2007/0064932 A1* | 3/2007 | Struik et al. | 380/30 |
| 2007/0288760 A1* | 12/2007 | Euchner et al. | 713/189 |
| 2008/0034203 A1* | 2/2008 | Camnisch et al. | 713/156 |
| 2009/0074179 A1* | 3/2009 | Futa et al. | 380/28 |
| 2009/0100267 A1* | 4/2009 | Brown et al. | 713/176 |
| 2009/0129600 A1* | 5/2009 | Brickell et al. | 380/282 |
| 2009/0210716 A1* | 8/2009 | Chen | 713/176 |
| 2009/0217041 A1* | 8/2009 | Ramzan et al. | 713/168 |
| 2009/0217042 A1* | 8/2009 | Ramzan et al. | 713/168 |
| 2010/0122093 A1* | 5/2010 | Tuyls et al. | 713/180 |
| 2010/0251351 A1* | 9/2010 | Teranishi | 726/7 |
| 2011/0013771 A1* | 1/2011 | Camenisch et al. | 380/46 |
| 2011/0194694 A1* | 8/2011 | Struik | 380/255 |
| 2012/0096273 A1* | 4/2012 | Campagna et al. | 713/176 |
| 2012/0096274 A1* | 4/2012 | Campagna et al. | 713/176 |

OTHER PUBLICATIONS

ISO/IEC 9796-3:2006: Information technology—Security techniques—Digital signature schemes giving message recovery—Part 3: Discrete logarithm based mechanisms, 2006.

NIST SP 800-108, Recommendation for Key Derivation Using Pseudorandom Functions, National Institute of Standards and Technology, Nov. 2007.

Federal Information Processing Standards Publication (FIPS Pub) 180-2. Specifications for the Secure Hash Standard, 2002.

M. Jakobsson, K. Sako, and R. Impagliazzo. Designated Verifier Proofs and Their Applications. In Proceedings of EUROCRYPT'96, LNCS 1070 (1996), 143-154.

Di Felice, M.; Supplementary Search Report from corresponding European Application No. 11861544.2 ; search completed Nov. 13, 2014.

* cited by examiner

KEYED PV SIGNATURES

CROSS REFERENCE TO RELATED APPLICATIONS

The present application claims the benefit of PCT Application No. PCT/CA2011/050506 filed Aug. 19, 2011, which claims priority from U.S. Provisional Patent Application No. 61/454,445 filed Mar. 18, 2011. The present application also claims the benefit of U.S. Provisional Patent Application No. 61/454,445 filed Mar. 18, 2011. The entire contents of PCT Application No. PCT/CA2011/050506 and U.S. Provisional Patent Application No. 61/454,445 are hereby incorporated herein by reference.

TECHNICAL FIELD

The following relates to digital signatures with message recovery.

BACKGROUND

Digital signatures are well known as a computer implemented technique for authenticating a message. Verification of the signature confirms that the message signed corresponds to the message received. Many digital signature schemes have been proposed and among those known signature schemes are a class of signatures that permit partial or complete recovery of the message from the signature. A particular efficient digital signature scheme is that known as the Pintsov-Vanstone signatures, commonly referred to as PV signatures.

The Elliptic Curve Pintsov-Vanstone Signature (ECPVS) scheme provides digital signatures with partial message recovery. Such schemes are presented in ANSI Draft X9.92-2007-02-21 (Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2007), and ISO/IEC 9796-3 (ISO/IEC 9796-3:2006: Information technology—Security techniques—Digital signature schemes giving message recovery—Part 3: Discrete logarithm based mechanisms, 2006), both of which are incorporated herein by reference, Partial message recovery in a digital signature scheme reduces the bandwidth requirement of transmitting a (message, signature) pair. This works by "merging" a portion of the message (the recoverable portion) with the signature value (while not increasing the size of the signature), and not transmitting this part of the message. If the signature is valid, the verifier recovers the recoverable part of the message.

BRIEF DESCRIPTION OF THE DRAWINGS

The features will become more apparent in the following detailed description in which reference is made to the appended drawings wherein.

DESCRIPTION

Figure 1:
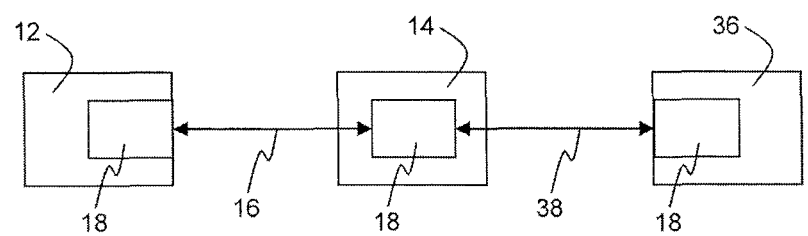
FIG. 1 is a schematic representation of a data communication system.

The original Elliptic Curve Pintsov-Vanstone Signature scheme has been extended to the keyed Pintsov-Vanstone signature scheme (keyed PV, or kPV for short). Keyed PV is a signature scheme with confidential message recovery, where only the intended recipient may recover part of the message. This is in contrast to some digital signature schemes where the message is public, and anyone may verify the signature, given the signer's public key.

A PV scheme is described in commonly owned U.S. Pat. Nos. 7,249,259 and 7,877,610, which are incorporated herein by reference.

The PV signature scheme (and variants) may be instantiated using the group of points on an elliptic curve. Let $E(F_q)$ be the set of points on the elliptic curve E over the finite field with q elements. Each point has a pair of co-ordinates that are elements of the underlying finite field and satisfy the elliptic curve E. This set forms a group under a binary operation referred to as point addition. Typically, the set is selected to have a size $l=rn$, where n is a large prime and the co-factor r is a (relatively) small integer. A generator of the subgroup of order n is denoted G, and all group arithmetic will take place in this subgroup. By convention, additive notation is used, e.g., for the sum of two points P and Q we write P+Q, and scalar multiplication by an integer k is kP.

The signature schemes herein may be instantiated using any finite abelian group. For example, we could use a subgroup of Zp, the group of integers modulo a prime p. In this case the group order is p−1, and the generator will again generate a subgroup of order n, where np−1. It will be appreciated that the size of the subgroup, and primality of n are security requirements but not required to instantiate the scheme, i.e., one could instantiate the signature scheme using any subgroup, but it may not be secure.

Traditionally, arithmetic in subgroups of Zp is written multiplicatively, the product of two elements P and Q is PQ and the analogue of scalar multiplication by k is exponentiation, and denoted $P^k$.

In accordance with the keyed PV scheme, a message sent by a first correspondent to a second correspondent is divided into a first portion which is hidden and is recovered during verification, and a second portion which is visible and is required as input to the verification algorithm.

A first signature component is generated by encrypting the first portion alone. An intermediate component is formed by combining the first component and the visible portion and cryptographically hashing them. A second signature component is then formed using the intermediate component and the signature comprises the first and second components with the visible portion.

A verification of the signature combines a first component derived from only from the hidden portion of the message with the visible portion and produces a hash of the combination. The computed hash is used together with publicly available information to generate a bit string corresponding to the hidden portion. If the required redundancy is present the signature is accepted and the message reconstructed from the recovered bit string and the visible portion.

Keyed PV allows a signer (the first correspondent) to choose a recipient (the second correspondent), and create a signature on a message M=N1∥N2∥V. Any party may verify that N1 and V were signed by the first correspondent, but N2 is encrypted so that only the second correspondent may recover it.

The keyed PV scheme starts with a signer (the first correspondent), with key pair $(d_A, G_A)$ on an appropriate elliptic curve. This is the algorithm in which the first correspondent signs a message M=N1∥N2∥V, where N1 and V will be signed without confidentiality, and N2 is signed with confidentiality, so that only the second correspondent may recover N2 and verify that it was signed by the first correspondent.

During verification, the verifier (the second correspondent) will recover some $N'_i$ and must be sure that $N'_i=N_i$. Requiring that $N_i$ have sufficient redundancy is one way to address this issue: it allows $N'_i$ to be identified as belonging to a set of valid plaintexts. Given sufficient redundancy, it should be infeasible for a forger to produce a signature which satisfies all requirements, but has $N'_i \neq N_i$. An alternative way to recognize a decrypted message as valid is to use authenticated encryption. We call the N2 the hidden part of the message (which will be encrypted for the recipient) and (N1, V) the visible parts of the message (visible to anyone, authenticated by the signer).

Either or both of N1 and V may be substituted with a predetermined string, such as a null string, a predefined redundancy, or other predetermined string.

Referring to FIG. 1, a data communication system 10 includes a pair of correspondents 12, 14 connected by a communication link 16 and a third party 36 connected to at least the second correspondent 14 by a further communication link 38. The correspondents 12, 14 are each a computing device, such as a personal computer, personal digital assistant, smart phone, cellular phone, ATM, Point-of-Sale device, server, entertainment system component, or other such device having a computing capability and provided to exchange digital information with other correspondents. The communication links 16, 38 may each be a telephone link, wireless or landline, local area network (LAN), RF link, or other such link provided to transfer information between the correspondents. Although shown for illustrative purposes as direct connection between correspondents 12, 14 and 36 it will be appreciated that the communication links 16, 38 may be part of a more extensive network and that these links may be routed through multiple correspondents in passing from correspondent 12 to correspondent 14 to third party 36.

The third party 36 may be provided with a device similarly configured to the correspondents 12, 14.

Figure 2:
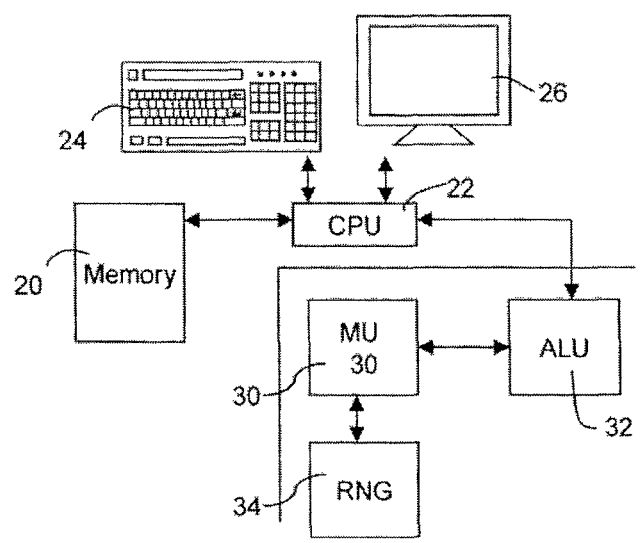
FIG. 2 is a representation of a cryptographic unit used in the system of FIG. 1.

Each of the correspondents 12, 14 and the third party 36 may be similar in operation when communicating over the links 16, 38 (as a sender or receiver) and therefore only one correspondent will be described in detail. Referring therefore to FIG. 2, correspondent 12 includes a cryptographic unit 18 that communicates with a memory 20 and a processor 22. The correspondent may also include a data input unit 24, such as a keypad or card reader, and a display device, 26, depending on the intended purpose of the correspondent 12.

The cryptographic unit 18 is provided to manage secure communications between the correspondents 12, 14 over the communication link 16. The cryptographic unit 18 includes a secure memory 30, which may be part of the memory 20 or a separate memory module, and an arithmetic logic unit (ALU), 32, that operates under the control of the processor 22 to perform arithmetic operations necessary to implement a chosen cryptographic protocol. The processor 22 includes one or more instruction sets to implement respective protocols.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the cryptographic unit or accessible or connectable thereto. Any application or module herein described may be implemented using computer readable/executable instructions that may be stored or otherwise held by such computer readable media.

The memory 30 stores the parameters of the cryptosystem implemented by the cryptographic unit 18. In the present example, the cryptosystem is a public key elliptic curve cryptosystem in which cryptographic protocols are implemented based on the intractability of the discrete log problem in an elliptic curve group defined over a finite field. The memory 30 therefore stores the parameters of the curve, such as the generator point G and the order, n, of the elliptic curve group E. It is appreciated that the examples provided herein refer to an elliptic curve group E, but the same principles could also apply to other groups, such as those for which the discrete logarithm problem is known to be hard to solve (e.g. in prime order subgroups of $Zp^*$, where p is a prime).

The cryptographic unit 18 also includes a random number generator (RNG) 34, whose output is provided to memory 30 for use by the ALU 32. The memory 30 also stores securely an ephemeral private key x that is a bit string derived from the output of the random number generator 34.

The first step in the keyed PV signature scheme requires all parties to agree on a set of domain parameters that are stored in the memory 30. These parameters include:

1. A suitable elliptic curve group of order n, with generator G (see SEC2: Recommended Elliptic Curve Domain Parameters version 2.0, Standards for Efficient Cryptography Group, 2000, which is incorporated herein by reference).
2. A symmetric key encryption function E, with corresponding decryption function D. An example is AES in counter or CBC mode. See FIPS PUB 197 for details of AES and A. J. Menezes, P. C. van Oorschot and S. A. Vanstone. Handbook of Applied Cryptography, CRC Press, 1997, ISBN 0-8493-8523-7§7.2.2, both of which are incorporated herein by reference, for information on modes of operation. We also note that the encryption function may be replaced with authenticated encryption, and the redundancy requirement removed. In the following we say decryption is successful if the redundancy requirement is satisfied, or if the authenticated encryption algorithm decrypts without error.
3. A key derivation function, denoted KDF, which outputs keys suitable for use with E. Example KDFs are given in NIST SP 800-108 (NIST SP 800-108, Recommendation for Key Derivation Using Pseudorandom Functions, National Institute of Standards and Technology, November, 2007), incorporated herein by reference.
4. A cryptographic hash function which maps arbitrary length inputs to fixed-length outputs. Example hash functions are the SHA-2 family, see FIPS PUB 180-2 (Federal Information Processing Standards Publication (FIPS PUB) 180-2. Specifications for the Secure Hash Standard, 2002), incorporated herein by reference.
5. Encoding methods to communicate values (integers, group elements, etc.) between parties (an example encoding could be specified by ASN.1). The signer and verifier must also agree upon a common encoding of lists of values as bitstrings before hashing them (for example: 1) convert all values to octet strings, then 2) concatenate hash of the octet strings). As with hashing, an encoding is require before deriving keys. With both the KDF and hash function, encoding may incorporate additional information such as the date.

For security of the scheme, the domain parameters must be chosen carefully. Further details on parameter choices are available in the ASC X9.92 Draft (see ANSI Draft X9.92-2007-02-21: Public Key Cryptography for the Financial Services Industry, Digital Signature Algorithms Giving Partial Message Recovery Part 1: Elliptic Curve Pintsov-Vanstone Signatures (ECPVS), Accredited Standards Committee X9, Inc., 2007, incorporated herein by reference).

Additionally for security, the signer and recipient require secure random number generators when generating keys and signing or converting messages. Going forward, we assume that all parties are in possession of the domain parameters.

Keyed PV Key generation by a first correspondent comprises:
1. Choose $d_A$ at random from $[0, \ldots, n]$ as an output of the random number generator 34.
2. Compute $G_A = d_A G$ using the arithmetic logic unit 32.
3. Output $(d_A, G_A)$ where $d_A$ is the secret key and $G_A$ is the public key. The secret key $d_A$ is securely stored in the memory 30

The first correspondent also has received the second correspondent's public key $G_B = d_B G$, which is also stored in the memory 30. A message M is parsed in to components $N_1$, $N_2$, and V so that $M = N_1 \| N_2 \| V$. A keyed PV signature generation by the first correspondent comprises:
1. Using the RNG 34, choose r at random from $[0, \ldots, n]$ and compute, using the ALU 32, $Q = rG$ and $Q_B = rG_B$.
2. Using the ALU 32, construct key $k_1 = KDF(Q)$ and $k_2 = KDF(Q_B)$, where KDF is a key derivation function that takes as input a point, and generates an encryption key.
3. Using the ALU 32, compute $c_1 = E(N_1, k_1)$, and $c_2 = E(N_2, k_2)$ where E is the encryption scheme specified by the domain parameters.
4. Using the ALU 32, compute $h = Hash(c_1 \| c_2 \| V)$, where Hash is a suitable hash function, specified by the domain parameters.
5. Using the ALU 32, convert h to an integer e.
6. Using the ALU 32, calculate $s = r + e \cdot d_A \pmod{n}$.
7. Output $(s, c_1, c_2, V)$, which is the signature, to the second correspondent.

$Q_B = (rd_B)G$ is a Diffie-Hellman value. The following algorithm performs a signature verification of a signed message $(s, c_1, c_2, V)$ and recovers $N_2$, when provided with the first correspondent's public key, and the second correspondent's private key $d_B$.

Given the signed message $(s, c_1, c_2, V)$, the first correspondent's public key $G_A$, and the second correspondent's private key $d_B$, signature verification can be performed by the second correspondent using the cryptographic unit 18 at the second correspondent. Message recovery using the ALU 32 comprises:
1. Compute $h = Hash(c_1 \| c_2 \| V)$, with the same hash function used in the signature generation scheme, and any additional input information.
2. Convert h to an integer e.
3. Compute $Q_B' = d_B[sG - eG_A]$ and $Q' = sG - eG_A$.
4. Compute $k_1' = KDF(Q_B')$ and $k_2' = KDF(Q_B')$, using the KDF specified by the domain parameters.
5. Compute $N_1' = E^{-1}(c_1, k_1')$ and $N_2' = E^{-1}(c_2, k_2)$.
6. If $N_1'$ is recognized as a valid plaintext (i.e., it contains the expected redundant information, or the authenticated encryption mode's decryption operation is successful) then return $N_1'$ and VALID, else return NULL and INVALID. Similarly for $N_2'$.

It will be noted that without the second correspondent's private key, a verifier may still verify that the string $c_1 \| c_2 \| V$ was signed by the first correspondent, and recover $N_1$ from $c_1$. the second correspondent's private key is only required to recover $N_2$ from $c_z$.

It is also possible to have signatures which are "half-valid", meaning $c_1$ is valid, but $c_2$ is invalid. In this case the signature authenticates $N_1$ and V only.

One aspect is a system and method enabling the recipient correspondent of a keyed PV signature to convert it to a signature with properties similar to a traditional signature (i.e., where the message is public and may be verified by anyone), removing the keyed aspect of the signature.

This allows messages signed by the first correspondent with the keyed PV signature scheme to be transferred from the first correspondent to the second correspondent in a non-repudiable fashion: the first correspondent cannot deny having signed a message, and the second correspondent cannot deny having converted the signature.

The second correspondent can convert a kPV signature to an unkeyed signature and transfer the entire signed message to a third party, who can then verify that:
1. the first correspondent signed both the hidden and visible parts of the message,
2. the second correspondent was the intended recipient of the message, and
3. the second correspondent has converted the signature honestly, i.e., that the revealed recovered confidential part of the message is correct (or that a failure to recover was caused by the first correspondent).

The second correspondent can output the decryption key (for the symmetric-key encryption of the confidential part of the message) and use a zero-knowledge (ZK) proof of knowledge to convince the third party that the key the second correspondent presents is the correct one. In other words, the second correspondent convinces the third party that the decryption key was computed correctly without revealing his secret key.

Despite the use of a ZK proof, efficient, non-interactive instantiations are possible (one such instantiation is provided herein). The new signature is made up of the old signature, the decryption key, and the proof of knowledge. The overhead is three values, one group element, one element the size of the group order, and one hash digest. Since conversion requires knowledge of the second correspondent's secret key, it is not possible for the first correspondent to create a signature and then create the converted version; only the second correspondent may perform the conversion.

It is also possible to enable the first correspondent to convert a signature on its own, however, the result makes it clear that the second correspondent did not participate in the conversion.

Suppose, for example, the second correspondent is the recipient of a kPV signature from the first correspondent, and that the second correspondent would like to show the confidential part of the message to the third party. Additionally, the third party should be able to verify that the first correspondent signed the confidential part of the message.

Possible applications are forwarding kPV-signcrypted emails, or auditing electronic transactions (e.g., payments) that use keyed PV signatures. In the second application, it may be required that the first correspondent or the second correspondent reveal the hidden portion of a kPV signature to a third party in a verifiable manner, for example, to resolve a dispute.

Enabling the second correspondent to reveal $k_2'$ to the third party may not provide the desired verification. The ciphertext $c_2$ is fixed: since it is signed by the first correspondent, any attempt by the second correspondent to change it would be considered a forgery. A dishonest second correspondent may try and choose some $k_{(bar)}$ such that $E^{-1}(c_2, k_{(bar)}) = N_{2(bar)}$, for some $N_{2(bar)} \neq N_2'$, but still output as a valid ciphertext by the decryption algorithm (Recall that $N_2'$ is the plaintext recovered by an honest second correspondent). Arbitrary E are not designed so that this is infeasible. Even assuming the second correspondent cannot find another $k_{(bar)}$ for which $E^{-1}(c, k_{(bar)})$ does not cause the verifier to abort, the first correspondent may have created her signature incorrectly, in particular she may create $c_2$ incorrectly.

For example, the first correspondent might choose $c_2$ to be a random string. The public verification of $(s, c_1, c_2, V)$ accepts, since the second correspondent's private key is required to check $c_2$. However, the second correspondent should be able to prove to the third party that the first correspondent created the signature incorrectly, without revealing his private key. If the second correspondent reveals $k_2'$ to the third party, the third party cannot tell whether the first correspondent created $c_2$ incorrectly, or the second correspondent created $k_2'$ incorrectly. Either can cause $E^{-1}(c_2, k_2')$ to fail. Therefore, simply revealing $k_2'$ is not enough.

Figure 3:
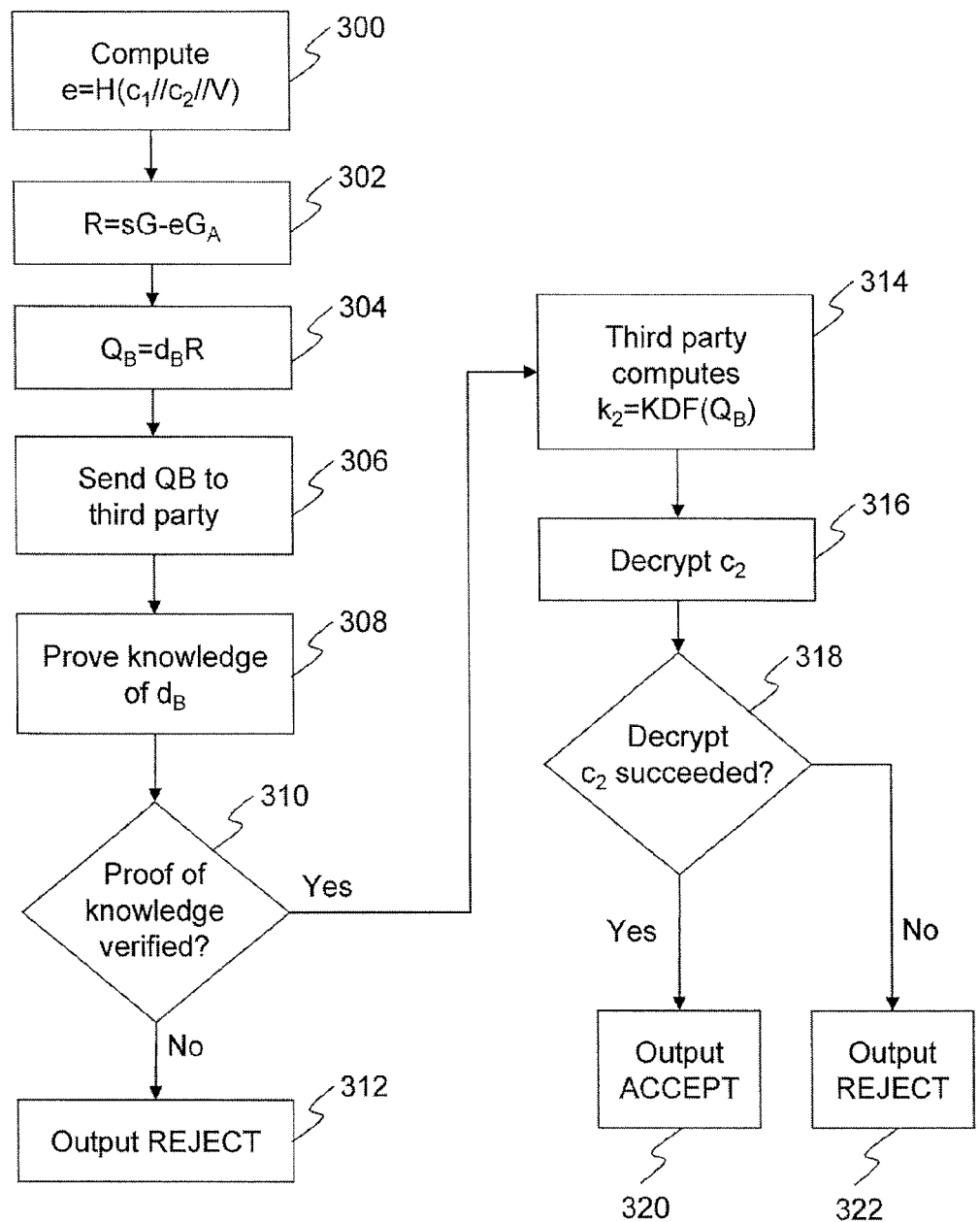
FIG. 3 is a flowchart illustrating a second correspondent converting and transferring a first correspondent's keyed PV signature to the third party.

Referring now to FIG. 3 a method is described for enabling the second correspondent to convert and transfer the first correspondent's keyed PV signature to the third party. In this first description we do not specify the ZK proof protocol. It may be interactive or non-interactive, and the resulting proof may or may not be transferable. By "transferable" in this setting we are referring to the third party's ability to convincingly present the proof to another party.

Given a kPV signature $(s, c_1, c_2, V)$ from the first correspondent to the second correspondent, the second correspondent's public and private key $(d_B, G_B)$, and the first correspondent's public key $G_A$, the second correspondent converts the signature using its ALU 32 as follows:

1. Compute $e = H(c_1 \| c_2 \| V)$ (300)
2. Let $R = SG - eG_A$ (302).
3. Compute $Q_B = d_B R$ (304) and send $Q_B$ to the third party (306).
4. Prove knowledge of $d_B$ (308), such that $G_B = d_B G$ and $Q_B = d_B R$. Note that e and R may be computed from the original kPV signature (which is public). Output 'reject' (312) if the proof does not verify (30).
5. The third party may use $Q_B$ to compute $k_2 = KDF(Q_B)$ (314) and use $k_2$ to decrypt $c_2$ (316). If $c_2$ decrypts successfully (318), the third party outputs 'accept' (320), and 'reject' (322) otherwise. When $c_2$ does not decrypt successfully, the third party concludes that the first correspondent created the signature incorrectly.

The third party obtains (N2 or ⊥) and proof from the second correspondent that the first correspondent signed it.

In the case when the proof of knowledge is non-interactive, we denote it π. The new signature is then $(s, c_1, c_2, V, Q_B, \pi)$, and $G_A$ and $G_B$ are required for verification. We now describe an efficient way to construct it.

Figure 4A:
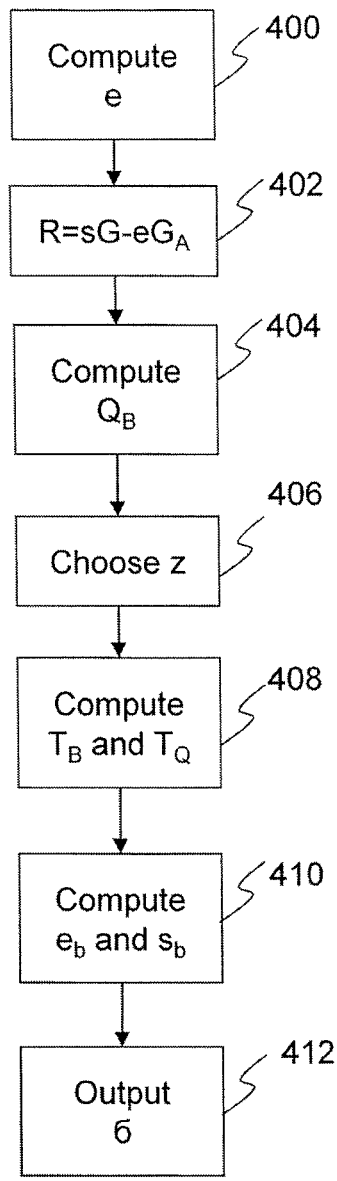
FIG. 4 is a flowchart illustrating non-interactive proof and verification.

Referring now to FIG. 4, non-interactive proof and verification is now described. Given a kPV signature $(s, c_1, c_2, V)$ from the first correspondent to the second correspondent, the second correspondent' key pair $(d_B, G_B)$, and the first correspondent's public key $G_A$, the method comprises:

Proof generation using the ALU 32 of the second correspondent, as shown in FIG. 4a is as follows:

1. Compute $e = H(c_1 \| c_2 \| V)$ (400), and let $R = sG - eG_A$ (402)
2. Compute $Q_B = d_B R$ (404).
3. Choose z (406) at random, using RNG 34, from $[0, \ldots, n]$ and compute (408) $T_B = zG$ and $T_Q = zR$.
4. Compute (410) $e_b = H(s \| c_1 \| c_2 \| V \| Q_B \| T_B \| T_Q)$, and $s_b = z + e_b b \pmod{n}$.
5. Output the new signature $\sigma = (s, c_1, c_2, V, Q_B, \pi = (s_b, e_b))$ to the third party (412).

Figure 4B:
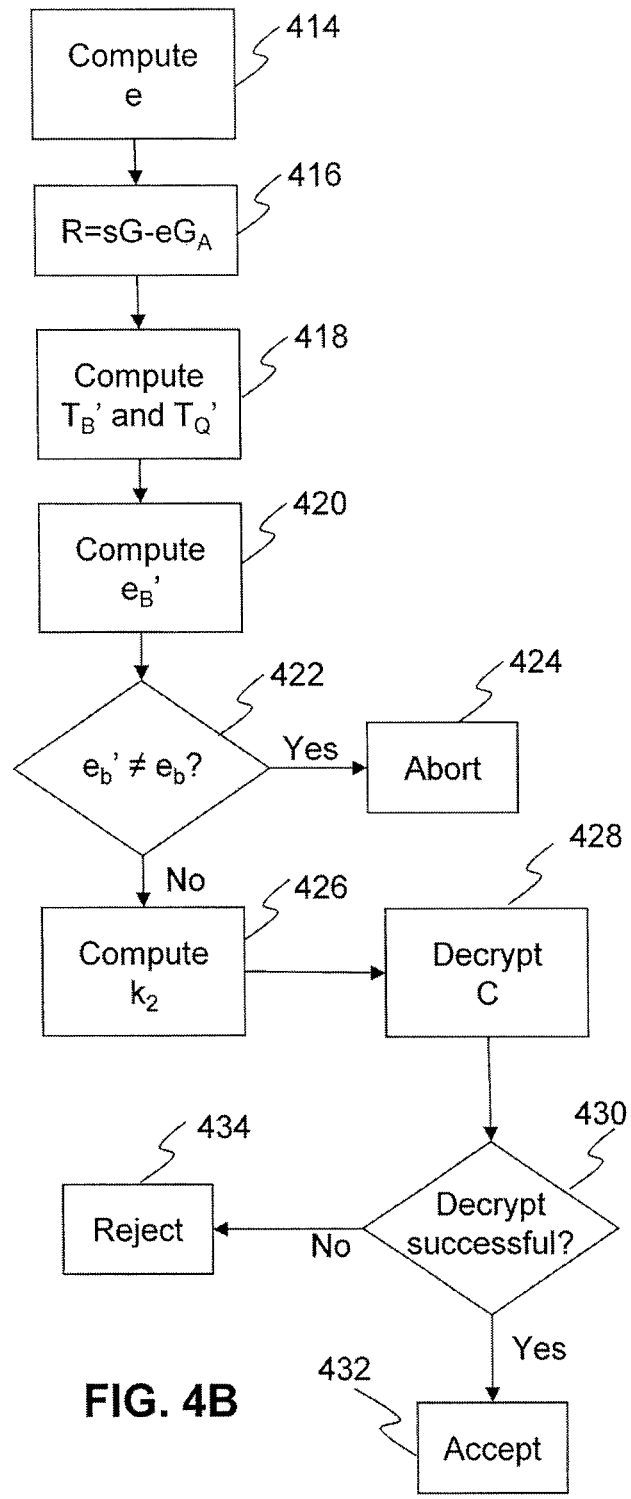

Verification of σ using the ALU 32 of the second correspondent, as shown in FIG. 4b is as follows:

1. Compute $e = H(c_1 \| c_2 \| V)$ (414), and let $R = sG - eG_A$ (416).
2. Compute (418) $T_B' = s_b G - e_b G$, and $T_Q' = s_b R - e_b R$.
3. Compute (420) $e_B' = H(s \| c_1 \| c_2 \| V \| T_B' \| T_Q')$, and abort (424) if $e_B' \neq e_b$ (422).
4. Compute $k_2 = KDF(Q_B)$ (426) and decrypt c (428). Accept (432) if $c_2$ decrypts successfully, reject (434) otherwise.

The second correspondent may append an additional message to be signed when creating $e_b$ (signed by him only, not the first correspondent).

The conversion described above allows the third party to forward the converted signature to anyone, since it may be verified by all.

Jakobsson et al. (see M. Jakobsson, K. Sako, and R. Impagliazzo. Designated Verifier Proofs and Their Applications. In Proceedings of EUROCRYPT'96, LNCS 1070 (1996), 143-154, incorporated herein by reference, define a primitive called designated verifier zero-knowledge proofs which are proofs of knowledge that may only be verified by a verifier of the prover's choice (the designated verifier (DV)). Further, the DV may not convince others of the proof's validity, even if he shares his secret information. In Jakobsson et al. both interactive and non-interactive DV proof systems are given. The intuition behind their constructions is to change the statement being proven from "X is true" to the compound statement "X is true OR I know the DV's secret key". This is convincing to the DV if he has not shared his secret key, but unconvincing to anyone else, since the DV can create such proofs. This non-transferability property of a zeroknowledge proof is also sometimes called deniability in the literature, since the prover can deny having created a proof.

Further extensions are possible. By encrypting $Q_B$ in the non-interactive proof and verification using the third party's public key, the values transferred to the third party will only allow the third party to view the message N and verify the signature. Whether the third party can convincingly show the message to another party still depends on the proof system the second correspondent uses to create π.

Another extension enables a correspondent to convert her own signature. Suppose now that the first correspondent has created a kPV signature $(s, c_1, c_2, V)$ with the second correspondent as the recipient, and would like to convert it. Since the first correspondent could always re-sign $M = N_1 \| N_2 \| V$, the purpose of this would be for the first correspondent to verifiably reveal to the third party a message she had previously sent to the second correspondent. For this extension, the first correspondent must keep the ephemeral secret, r, used when creating the signature. Referring to the notation in the keyed PV signature generation method given above, the first correspondent must reveal $Q_B = rG_B$, the Diffie-Hellman value used to derive $k_2$, the encryption key used for ciphertext $c_2$. the first correspondent must prove knowledge of r, such that $SG - eG_A = rG$ and $Q_B = rG_B$. This proof must be zero-knowledge, since revealing r allows $d_A$ to be recovered.

Upon accepting this proof, the third party computes $k_2=KDF(Q_B)$, and decrypts $C_2$, accepting it as valid if decryption is successful. If decryption fails, clearly the first correspondent is at fault. In practice the first correspondent could set r as the output of a pseudorandom function, keyed with her secret key. The input would consist of V and a counter. The counter is important to ensure that no ephemeral value gets re-used. This still requires the first correspondent retain some state to store the counter, but it need not be secret.

Another extension enables a correspondent to convert a received signature and store the converted signature for future use. Suppose that the first correspondent sends the second correspondent a kPV signature $(s,c_1,c_2,V)$ that corresponds to the second correspondents public key $G_{B1}$ and private key $d_{b1}$. The second correspondent stores the signature in its memory, but not the recovered confidential portion thereof. Later, the second correspondent may be required to change its key pair, creating a new key pair $(d_{b2}, G_{B2})$ and deleting $d_{b1}$. Such a key change is common in PKI systems, since limiting the time period during which a key is valid limits the risks associated with compromise of the key pair. Since the second correspondent may not be able to recover the confidential portion of the signature after deleting $d_{b1}$, it may convert the signature prior to such deletion to allow the second correspondent to verify the signature without knowledge of $d_{b1}$. Furthermore, the second correspondent can convert the signature to be verifiable only with knowledge of $d_{b2}$.

Although the above has been described with reference to certain specific embodiments, various modifications thereof will be apparent to those skilled in the art without departing from the spirit and scope as outlined in the claims appended hereto. The entire disclosures of all references recited above are incorporated herein by reference.

What is claimed is:

1. A computer-implemented method of enabling a second correspondent device to prove to a third party the authenticity of a signed message received from a first correspondent device, the method comprising:
   (a) obtaining the signed message at the second correspondent device comprising a confidential component;
   (b) operating upon at least a portion of the signed message at the second correspondent device comprising the confidential component to generate a first value;
   (c) generating a second value at the second correspondent device using the first value, a public value of the first correspondent device, and a private value of the second correspondent device;
   (d) sending the second value by the second correspondent device to the third party, the third party coupled to the second correspondent device; and
   (e) proving knowledge to the third party by the second correspondent of the private value of the second correspondent device by sending the second value for subsequent verification by the third party, the third party being configured to retrieve a decryption key from the second value to decrypt a portion of the signed message and accepting said portion as valid if decryption is successful.

2. The method according to claim 1 wherein the signed message further comprises one or more of: a recoverable component, a visible component, or a combination thereof.

3. The method according to claim 2 wherein the recoverable component, the visible component, or both the recoverable component and the visible component are a predetermined string.

4. The method according to claim 2 wherein the signed message is generated according to an ECPVS scheme.

5. The method according to claim 1 wherein generating the second value comprises generating an intermediate value using the first value and the public value of the first correspondent device prior to using the private value of the second correspondent device.

6. The method according to claim 1 wherein proving knowledge to the third party comprises:
   (a) computing a third value, and a fourth value using the first value and the public value of the first correspondent device;
   (b) outputting a new signed message comprising the signed message, the second value, and a pair of proof of knowledge components comprising the third value and the fourth value, to enable the third party to verify the new signed message thereby verifying the authenticity of the signed message.

7. The method according to claim 6 wherein enabling the third party to verify the new signed message comprises:
   (a) computing the first value;
   (b) computing a fifth value using the first value and the public value of the first correspondent;
   (c) computing representations of the third value and the fourth value using the proof of knowledge components and the fifth value;
   (d) computing a representation of one of the pair of proof of knowledge components using the representations of the third value and the fourth value;
   (e) comparing the representation of one of the pair of proof of knowledge components with a corresponding one of the pair of proof of knowledge components to verify the authenticity of the new signed message; and
   (f) upon verifying the authenticity of the new signed message:
      (i) computing a key using the second value; and
      (ii) decrypting from the new signed message at least a portion of the signed message using the key.

8. The method according to claim 7 wherein at least the portion of the signed message has a characteristic enabling the third party to verify that it was generated by the first correspondent.

9. The method according to claim 8 wherein the characteristic is redundancy.

10. A device for proving to a third party the authenticity of a signed message received from a first correspondent, the device being associated with a second correspondent, the device comprising a processor configured for:
   (a) obtaining the signed message at the device comprising a confidential component;
   (b) operating upon at least a portion of the signed message comprising the confidential component to generate a first value;
   (c) generating a second value using the first value, a public value of the first correspondent device, and a private value of the second correspondent device;
   (d) sending the second value to the third party, the third party coupled to the second correspondent; and
   (e) proving knowledge by the second correspondent to the third party of the private value of the second correspondent device by sending the second value for subsequent verification by the third party, the third party being configured to retrieve a decryption key from the second value to decrypt a portion of the signed message and accepting said portion as valid if decryption is successful.

11. The device according to claim 10 wherein the signed message further comprises one or more of: a recoverable component, a visible component, or a combination thereof.

12. The device according to claim 11 wherein the recoverable component, the visible component, or both the recoverable component and the visible component are a predetermined string.

13. The device according to claim 11 wherein the signed message is generated according to an ECPVS scheme.

14. The device according to claim 10 wherein generating the second value comprises generating an intermediate value using the first value and the public value of the first correspondent device prior to using the private value of the second correspondent device.

15. The device according to claim 10 wherein proving knowledge to the third party comprises:
   (a) computing a third value, and a fourth value using the first value and the public value of the first correspondent device;
   (b) outputting a new signed message comprising the signed message, the second value, and a pair of proof of knowledge components comprising the third value and the fourth value, to enable the third party to verify the new signed message thereby verifying the authenticity of the signed message.

16. The device according to claim 15 wherein enabling the third party to verify the new signed message comprises enabling the third party to:
   (a) compute the first value;
   (b) compute a fifth value using the first value and the public value of the first correspondent;
   (c) compute representations of the third value and the fourth value using the proof of knowledge components and the fifth value;
   (d) compute a representation of one of the pair of proof of knowledge components using the representations of the third value and the fourth value;
   (e) compare the representation of one of the pair of proof of knowledge components with a corresponding one of the pair of proof of knowledge components to verify the authenticity of the new signed message; and
   (f) upon verifying the authenticity of the new signed message:
      (i) compute a key using the second value; and
      (ii) decrypt from the new signed message at least a portion of the signed message using the key.

17. The device according to claim 16 wherein at least the portion of the signed message has a characteristic enabling the third party to verify that it was generated by the first correspondent.

18. The device according to claim 17 wherein the characteristic is redundancy.

19. A non-transitory computer readable storage medium comprising computer executable instructions for enabling a second correspondent device to prove to a third party the authenticity of a signed message received from a first correspondent device said computer executable instructions comprising instructions for:
   obtaining the signed message at the second correspondent device comprising a confidential component;
   operating upon at least a portion of the signed message at the second correspondent device comprising the confidential component to generate a first value;
   generating a second value at the second correspondent device using the first value, a public value of the first correspondent device, and a private value of the second correspondent device;
   sending the second value by the second correspondent device to the third party, the third party coupled to the second correspondent device; and
   proving knowledge to the third party by the second correspondent of the private value of the second correspondent device by sending the second value for subsequent verification by the third party, the third party being configured to retrieve a decryption key from the second value to decrypt a portion of the signed message and accepting said portion as valid if decryption is successful.

* * * * *